United States Patent
Chin et al.

(10) Patent No.: US 10,291,847 B2
(45) Date of Patent: May 14, 2019

(54) PORTABLE DEVICE AND MANIPULATION METHOD

(71) Applicant: HTC Corporation, Taoyuan (TW)

(72) Inventors: Ssu-Po Chin, Taoyuan (TW);
Yung-Chao Tseng, Taoyuan (TW);
Hsin-Ti Chueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 128 days.

(21) Appl. No.: 14/846,992

(22) Filed: Sep. 7, 2015

(65) Prior Publication Data

US 2016/0255272 A1   Sep. 1, 2016

Related U.S. Application Data

(60) Provisional application No. 62/120,903, filed on Feb. 26, 2015.

(51) Int. Cl.
*H04N 1/00* (2006.01)
*H04N 5/77* (2006.01)
(Continued)

(52) U.S. Cl.
CPC ..... *H04N 5/23245* (2013.01); *H04L 65/1069* (2013.01); *H04N 1/00106* (2013.01);
(Continued)

(58) Field of Classification Search
None
See application file for complete search history.

(56) References Cited

U.S. PATENT DOCUMENTS

| 2008/0122947 A1* | 5/2008 | Yang | H04N 5/2252 348/231.99 |
| 2011/0126236 A1* | 5/2011 | Arrasvuori | H04N 21/4532 725/46 |

(Continued)

FOREIGN PATENT DOCUMENTS

| CN | 1867046 A | 11/2006 |
| CN | 1972328 A | 5/2007 |

(Continued)

OTHER PUBLICATIONS

Corresponding Taiwanese Office Action that these art references were cited dated Jan. 10, 2017.
Corresponding Chinese office action dated May 15, 2018.

*Primary Examiner* — Twyler L Haskins
*Assistant Examiner* — Quan Pham
(74) *Attorney, Agent, or Firm* — CKC & Partners Co., LLC

(57) ABSTRACT

A portable device and a manipulation method thereof are disclosed in this disclosure. The portable device includes a camera unit, a communication unit, a first switch button and a control module. The communication unit is configured for establishing a connection to a cloud server through a cellular telephony network. The first switch button is disposed on the portable device and configured for sensing a first manipulation input. The control module is coupled with the camera unit and the first switch button. In response to the first manipulation input sensed by the first switch button, the control module being adapted to trigger the camera unit for capturing an image, a streaming video or a video selectively according to a holding duration of the first manipulation input, and to trigger the communication unit for uploading the image, the streaming video or the video onto the cloud server.

17 Claims, 4 Drawing Sheets

(51) Int. Cl.
  *H04L 29/06* (2006.01)
  *H04N 5/232* (2006.01)

(52) U.S. Cl.
  CPC ..... *H04N 1/00209* (2013.01); *H04N 1/00244* (2013.01); *H04N 1/00387* (2013.01); *H04N 5/232* (2013.01); *H04N 5/77* (2013.01)

(56) References Cited

U.S. PATENT DOCUMENTS

| | | | |
|---|---|---|---|
| 2012/0009896 A1* | 1/2012 | Bandyopadhyay | G06F 1/1643 455/411 |
| 2013/0223810 A9* | 8/2013 | Simmons | H04N 21/4788 386/224 |
| 2014/0055633 A1 | 2/2014 | Marlin et al. | |
| 2014/0168117 A1* | 6/2014 | Kim | H04M 1/6505 345/173 |
| 2014/0333828 A1* | 11/2014 | Han | H04N 5/225 348/373 |
| 2016/0112636 A1* | 4/2016 | Yamaguchi | H04N 5/23245 348/158 |
| 2016/0182850 A1* | 6/2016 | Thompson | H04N 9/8205 348/158 |
| 2016/0227022 A1* | 8/2016 | Alameh | G06F 1/1643 |

FOREIGN PATENT DOCUMENTS

| | | | |
|---|---|---|---|
| CN | 102970523 A | | 3/2013 |
| CN | 103019542 A | | 4/2013 |
| CN | 103026701 A | | 4/2013 |
| CN | 103327160 A | * | 9/2013 |
| CN | 103402004 A | | 11/2013 |
| CN | 103533161 A | | 1/2014 |
| CN | 103546696 A | * | 1/2014 |
| JP | 2002-141978 A | | 5/2002 |
| TW | 201342902 A | | 10/2013 |

* cited by examiner

PORTABLE DEVICE AND MANIPULATION METHOD

CROSS-REFERENCE TO RELATED APPLICATION

This application claims the priority benefit of U.S. Provisional Application Ser. No. 62/120,903 filed Feb. 26, 2015, the full disclosures of which are incorporated herein by reference.

BACKGROUND

Field of Invention

The disclosure relates to a manipulation method and a portable device. More particularly, the invention relates to a manipulation method of a combination of functions on a portable device according to a manipulation input.

Description of Related Art

In order to increase mobility of electronic devices, designers are challenged to figure out how to reduce sizes and weights of the electronic devices. On a portable device, the size is a critical issue for the designer. A portable device (e.g., smart phones, digital cameras, sports cameras, tablets, or similar handheld devices) has less space for disposing buttons for different functions.

If the portable device has ten different functions and each of the functions requires an individual button to manipulate (e.g., trigger, control, configure, etc), the portable device must has at least ten individual buttons. In this case, each of the ten buttons will be small, hard to locate and easy to be damaged. On the other hand, the size of the portable device must be enlarged for accommodating these buttons. It is a dilemma between increasing the mobility or the maneuverability of the portable device. However, the cutting-edge portable device must be capable to fulfill many functions within a compact size.

SUMMARY

An aspect of the present disclosure is to provide a portable device including a camera unit, a communication unit, a first switch button and a control module. The communication unit is configured for establishing a connection to a cloud server through a cellular telephony network. The first switch button is disposed on the portable device and configured for sensing a first manipulation input. The control module is coupled with the camera unit and the first switch button. In response to the first manipulation input sensed by the first switch button, the control module being adapted to trigger the camera unit for capturing an image, a streaming video or a video selectively according to a holding duration of the first manipulation input, and to trigger the communication unit for uploading the image, the streaming video or the video onto the cloud server.

Another aspect of the present disclosure is to provide a manipulation method, which is suitable for the portable device including a camera unit, a communication unit and a first switch button. The manipulation method includes steps of: sensing a first manipulation input by the first switch button; triggering the camera unit for capturing an image, a streaming video or a video selectively according to a holding duration of the first manipulation input in response to the first manipulation input; and, triggering the communication unit for uploading the image, the streaming video or the video onto the cloud server over a cellular telephony network connection established by the communication unit in response to the first manipulation input.

Another aspect of the present disclosure is to provide a non-transitory computer-readable medium comprising one or more sequences of instructions to be executed by a processor of a portable device for performing aforesaid manipulation method.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
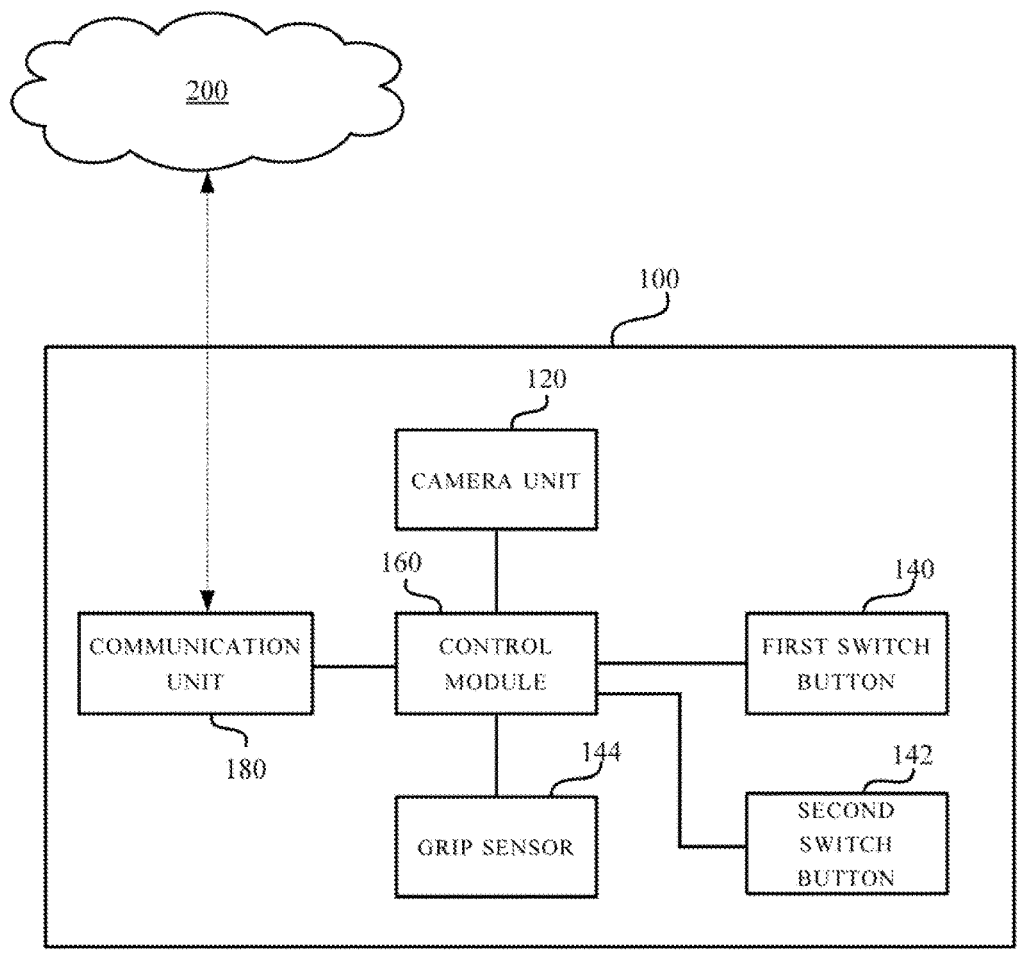
FIG. 1 is a schematic diagram illustrating a portable apparatus according to an embodiment of the disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Reference is made to FIG. 1, which is a schematic diagram illustrating a portable device 100 according to an embodiment of this disclosure. As shown in FIG. 1, the portable device 100 includes a camera unit 120, a first switch button 140, a control module 160 and a communication unit 180. In practices, the portable device 100 can be a camera device without display (such as a sports camera or a versatile camera) or other portable device (such as a smart phone, a digital camera, a tablet or a similar handheld device).

The communication unit 180 configured for establishing a connection to a cloud server 200 through a cellular telephony network. According to some embodiments, the communication unit 180 further includes a cellular telephony SIM slot (not shown in FIG. 1) to provide a cellular telephony network, and the cellular telephony network is based on a mobile network such as a 3G mobile network (e.g., HSDPA, CDMA2000, WCDMA, EDGE, etc) or a 4G mobile network (e.g., LTE, WiMax, etc). The cloud server 200 includes a cloud storage server (e.g., Dropbox, Google-Drive, OneDrive, etc), a social website server (e.g., Facebook, Google+, Instagram, etc) or a video broadcasting website server (e.g., a server of Youtube, Twitch, HTC ZOE, or any equivalent streaming video terminal).

In practical applications, the camera unit 120 of the portable device 100 includes lens, an optical sensor component, a focusing motor and/or a digital signal processor (DSP) for processing an image or a video captured by the camera unit 120. Aforesaid structures of the camera unit 120 is well known by a person in the art and not further discussed here.

In the embodiment, the portable device 100 has several functional modes. For example, the functional modes include a photo-capturing mode, a video-recording mode and a stream-broadcasting mode. When the portable device 100 is operated under the photo-capturing mode, the camera unit 120 is able to capture an image in response to a corresponding command. When the portable device 100 is operated under the video-recording mode, the camera unit 120 is able to record a video in response to another corresponding command. When the portable device 100 is operated under the stream-broadcasting mode, the camera unit 120 is able to record a streaming video in response to another corresponding command. The streaming video can be recorded and broadcasted in real-time to aforesaid cloud server 200, such as a social sharing website or a stream-broadcasting website.

On a conventional device, there might be different buttons (e.g., a shutter button and a recording button) for individually generating different commands (photo-capturing, video-recording, stream-broadcasting). If the user tends to share their images or videos, there must be even more buttons and a display panel for selecting the target image/video and activating the sharing function. However, it is hard to find enough space to dispose all these buttons on the portable device 100 for each of the functions.

In some embodiment, the first switch button 140 is a hardware switch button disposed on the portable device 100. The hardware switch button (i.e., the first switch button 140) can be manipulates by a user (e.g., click, double click, press down, press and hold, etc). Based on how the user manipulates the switch, the first switch button 140 will generate a first manipulation input. The first switch button 140 is utilized to generate different commands (e.g., a photo-shooting command, a video-recording command or a stream-broadcasting command) for triggering the portable device 100 into different functional modes with only one switch button. At the same time, the first manipulation input generated by the first switch button 140 is utilized to trigger the communication unit 180 to upload the images, videos or streaming videos onto the cloud server 200.

The first manipulation input generated by the first switch button 140 may has a variable holding duration of the first manipulation input. The holding duration is related to how long the switch button has been pressed down and held by the user. In some embodiments, the holding duration is counted separately for each time the first switch button 140 is pressed.

The control module 160 is coupled with the camera unit 120, the first switch button 140 and the communication unit 180. The control module 160 is configured for selecting one of the functional modes corresponding to the holding duration of the first manipulation input sensed by the first switch button 140, and triggering the portable device 100 into the selected functional mode. In practices, the control module 160 is a processor, a central processing unit, a control integrated chip, or a System-on-Chip (SOC) for executing some programs/instructions, performing computations and/or managing some processes of the portable device 100.

Figure 2:
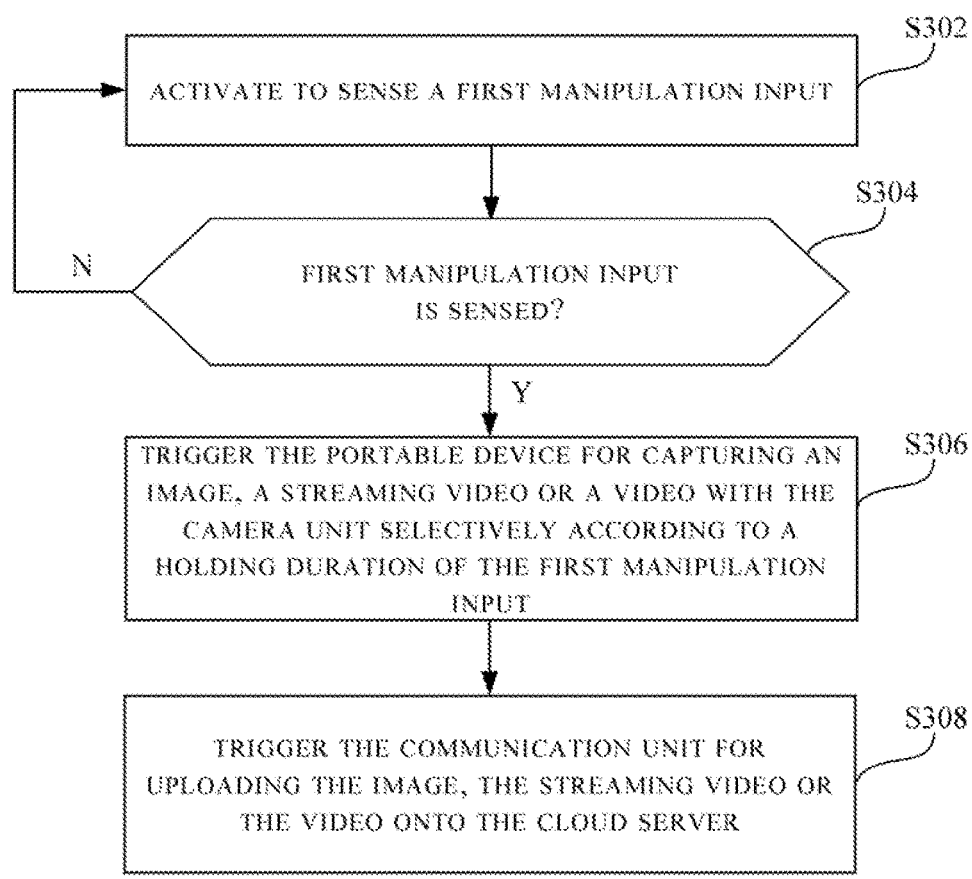
FIG. 2 is a flow chart diagram illustrating a manipulation method according to an embodiment of the disclosure.

Reference is also made to FIG. 2, which is a flow chart diagram illustrating a manipulation method 300 according to an embodiment of the disclosure. The manipulation method 300 is suitable to be utilized on the portable device 100 as disclosed in aforesaid embodiments.

As shown in FIG. 2, the manipulation method 300 executes step S302 for activating the first switch button (as the first switch button 140 shown in FIG. 1) to sense a first manipulation input. Step S304 is executed for determining whether the first manipulation input is sensed (e.g., the first manipulation input will be sensed when the user operates the first switch button 140 to activate some specific functions).

Step S306 is executed for triggering the portable device (as the portable device 100 shown in FIG. 1) for capturing an image, a streaming video or a video with the camera unit 120 selectively according to a holding duration of the first manipulation input. The portable device 100 has a plurality of functional modes including a photo-capturing mode, a video-recording mode and a stream-broadcasting mode. The portable device 100 is triggered into one of the functional modes corresponding to the holding duration of the first manipulation input sensed by the first switch button 140.

Step S308 is executed for triggering the communication unit (as the communication unit 180 shown in FIG. 1) for uploading the image, the streaming video or the video onto the cloud server (as the cloud server 200 shown in FIG. 1).

According to a demonstrational example, in response to the first switch button 140 is pressed and then released within a first predetermined duration (e.g., 0.8 second), the first manipulation input is regarded as a short press or a click, such that the camera unit 120 is triggered to capture the image.

In response to the first switch button 140 is pressed, held over the first predetermined duration (e.g., 0.8 second) and released within a second predetermined duration (e.g., 3 seconds), the first manipulation input is regarded as a long press, such that the portable device 100 is triggered to record the streaming video with the camera unit 120 in step S306 and the streaming video is lively broadcasted onto the cloud server 200 through the communication unit 180 in step S308. In this example, the streaming video can be started to broadcast from aforesaid long press, and the streaming video can be stopped from broadcasting when another short press or click is sensed in a following first manipulation input afterward.

In response to the first switch button 140 is pressed, held over the second predetermined duration (e.g., 3 seconds), the first manipulation input is regarded as a press-and-hold, such that the camera unit 120 is triggered to record the video in step S306. Afterward, in response to the first switch button 140 is released, the video is transmitted onto the cloud server 200 through the communication unit 180 in step S308. In this example, the video is record during the whole period while the first switch button 140 is holding (started from the first switch button 140 is pressed down and ended at the first switch button is released). The second predetermined duration is longer than the first predetermined duration, but the values of the first/second predetermined durations are not limited to 0.8 second and 3 seconds. The values of the first/second predetermined durations can be adjusted according to practical demands.

In aforesaid demonstrational example, the first manipulation input with the short press (or the click) triggers the portable device 100 to capture the image and upload the image. The first manipulation input with the long press triggers the portable device 100 to record the streaming video and broadcast the streaming video. The first manipulation input with the press-and-hold triggers the portable device 100 to record the video and upload the video. However, this disclosure is not limited thereto.

According to another demonstrational example, in response to the first switch button 140 is pressed and then released within a first predetermined duration (e.g., 0.8 second), the first manipulation input is regarded as a short press or a click, such that the camera unit is triggered to capture the image.

In response to the first switch button 140 is pressed, held over the first predetermined duration (e.g., 0.8 second) and released within a second predetermined duration (e.g., 3 seconds), the first manipulation input is regarded as a long press, such that the camera unit 120 is triggered to record the video in step S308. Afterward, in response to another short press or click is sensed, the video is transmitted onto the cloud server 200 through the communication unit 180 in step S308.

In response to the first switch button 140 is pressed, held over the second predetermined duration (e.g., 3 seconds), the first manipulation input is regarded as a press-and-hold, such that the portable device 100 is triggered to record the streaming video with the camera unit 120 in step S306 and the streaming video is lively broadcasted onto the cloud server 200 through the communication unit 180 in step S308. In this example, the streaming video can be started to broadcast from aforesaid press-and-hold and the streaming video can be stopped from broadcasting when the first switch button 140 is released.

In aforesaid demonstrational example, the first manipulation input with the short press (or the click) triggers the portable device 100 to capture the image and upload the image. The first manipulation input with the long press triggers the portable device 100 to record the video and upload the video. The first manipulation input with the press-and-hold triggers the portable device 100 to record the streaming video and broadcast the streaming video. However, this disclosure is not limited thereto.

Based on aforesaid embodiments and demonstrational examples, the portable device 100 and the manipulation method 300 is able to generate images, videos or streaming videos and upload these files onto the cloud server 200 with one manipulation input (i.e., the first manipulation input) by one switch button (i.e., the first switch button 140 shown in FIG. 1), such that the user can easily complete the image/video uploading (and/or broadcasting) on a compact portable device 100 with a minimal size. In some embodiments, the portable device 100 without a display panel is suitable to complete aforesaid operations and the manipulation method 300.

Figure 3:
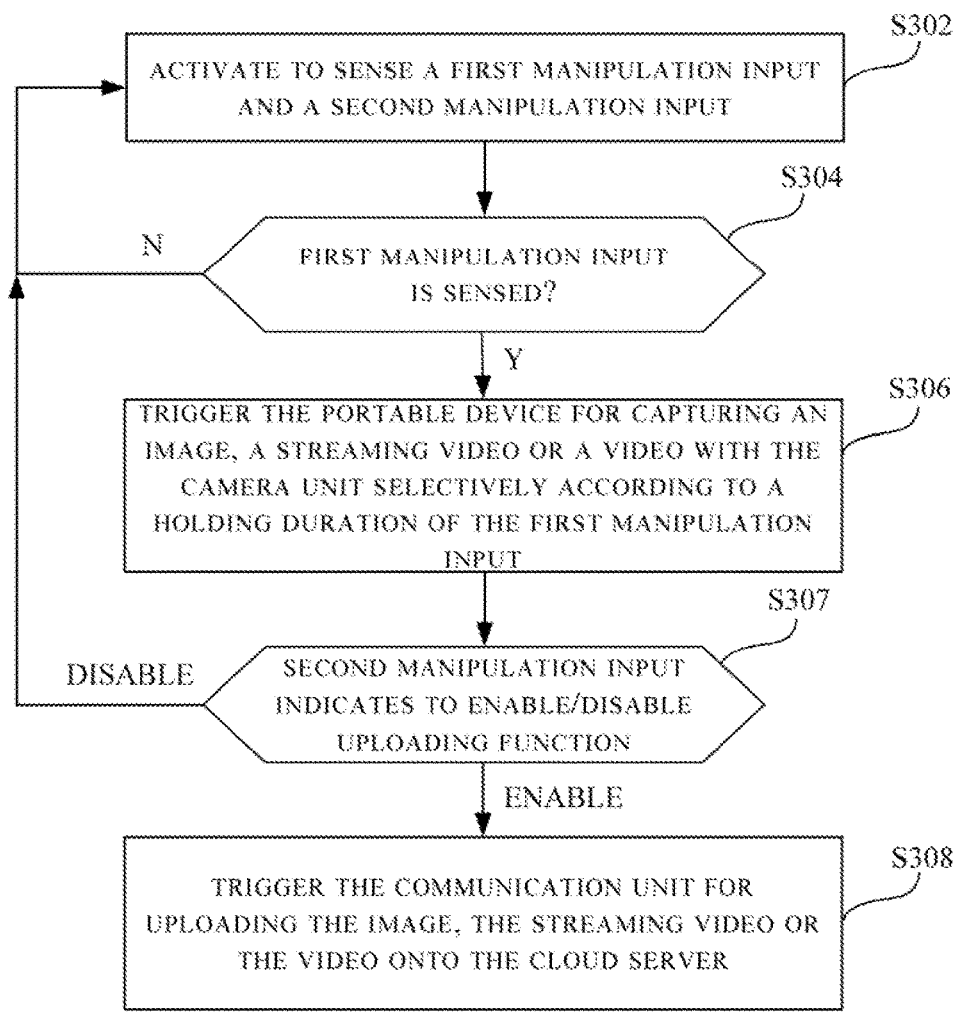
FIG. 3 is a flow chart diagram illustrating a manipulation method according to another embodiment of the disclosure.

In some embodiments, the portable device 100 further includes a second switch button 142. The second switch button 142 is disposed on the portable device 100 for sensing a second manipulation input. In some embodiments, the second switch button 142 is another hardware switch button disposed on the portable device 100 (e.g., the camera device without display). In some other embodiments, the second switch button 142 is a software-simulated button/key on a display panel of the portable device 100 (e.g., the smart phone, the digital camera, the tablet or the similar handheld device). The control module 160 is further adapted to enable or disable uploading function (may include the stream-broadcasting function) of the portable device 100 (e.g., turning off the communication unit 180) according to the second manipulation input. The user can turn on or turn off the uploading function of the portable device 100 through the second switch button 142. Reference is also made to FIG. 3, which is a flow chart diagram illustrating a manipulation method 400 according to an embodiment of the disclosure. The manipulation method 400 is suitable to be utilized on the portable device 100 as disclosed in aforesaid embodiments.

Compared to the manipulation method 300 as shown in FIG. 2, the manipulation method 400 as shown in FIG. 3 further includes step S307 for determining the second manipulation input sensed by the second switch button 142 indicates to enable or disable the uploading function. In response to the uploading function is disabled by the second manipulation input, the image, the video or the streaming video will not be upload to the cloud server 200 by the communication unit 180 immediately after aforesaid file is captured or recorded. In response to the uploading function is enabled by the second manipulation input, step S308 will be executed after the image, the video or the streaming video is captured or recorded.

Furthermore, the portable device 100 further includes an indictor unit (e.g., a LED indicator, not shown in FIG. 1) for indicating that the uploading function is currently turned on or turned off.

Figure 4:
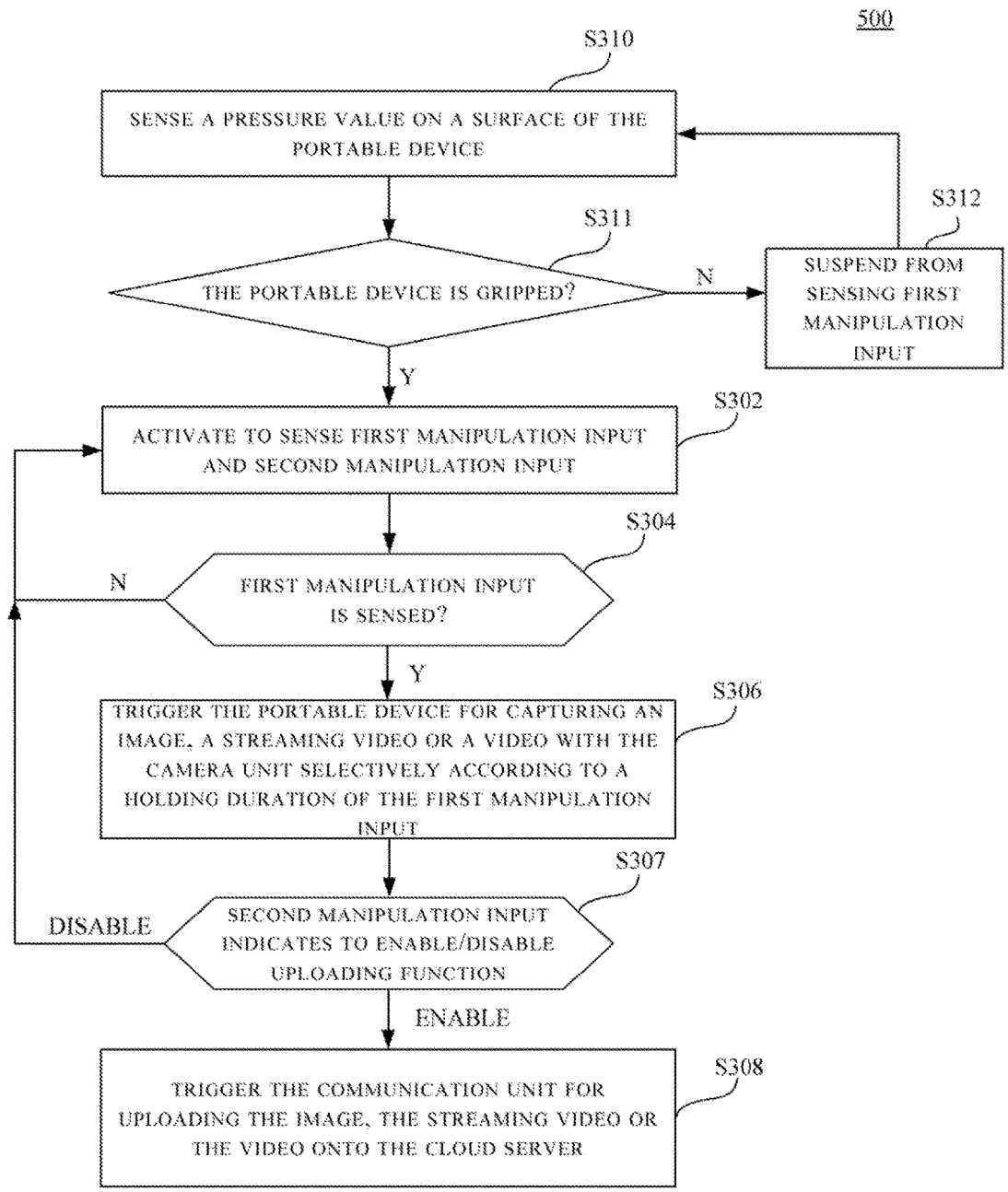
FIG. 4 is a flow chart diagram illustrating a manipulation method according to another embodiment of the disclosure.

In some embodiments, the portable device 100 further includes a grip sensor 144. The grip sensor 144 is disposed on the portable device 100. In some embodiments, the grip sensor 144 is a pressure sensor and configured for sensing a pressure value on a surface of the portable device 100. The control module 160 is further coupled with the grip sensor 144 and configured for determining whether the portable device 100 is gripped by the user. The first switch button 140 is deactivated in response to the portable device 100 is not gripped by the user. Reference is also made to FIG. 4, which is a flow chart diagram illustrating a manipulation method 500 according to an embodiment of the disclosure. The manipulation method 500 is suitable to be utilized on the portable device 100 as disclosed in aforesaid embodiments.

Compared to the manipulation method 300/400 as shown in FIG. 2 or FIG. 3, the manipulation method 500 as shown in FIG. 4 further includes steps S310~S312. Step S310 is executed for sensing the pressure value on the surface of the portable device 100. Step S311 is executed for determining whether the portable device 100 is gripped by the user according to the pressure value. In response to the portable device 100 is not gripped, step S312 is executed for suspending the first switch button 140 from sensing the first manipulation input.

Therefore, the portable device 100 is configured into a standby mode when the portable device 100 is not gripped by the user, and the first switch button 140 is suspended from updating the sensing result of the first manipulation input, so as to reduce the power consumption of the first switch button 140. Only when the portable device 100 is gripped by the user, the first switch button 140 is activated to provide the first manipulation input. Furthermore, the second switch button 142, the camera unit 120 and the communication unit 180 can also be switched into the standby mode when the portable device 100 is not gripped by the user.

Another embodiment of the disclosure is to provide a non-transitory computer readable storage medium with a computer program to execute aforesaid manipulation method 300/400/500 as shown in FIG. 2, FIG. 3 and FIG. 4.

Based on aforesaid embodiments, this disclosure is to provide a portable device, a manipulation method and a non-transitory computer readable storage medium, which are capable of performing multiple functions with a multi-purpose input sensor (e.g., button, key, switch, etc). The manipulation input sensed by the input sensor is analyzed and configured for triggering different functions of the portable device. Therefore, the portable device is able to perform as many functions as possible with fewer switch buttons or functional keys, such that the portable device can be light weighted and compact sized without cutting off functions. The portable device can be a camera device without display.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A camera device without display, comprising:
a camera unit;
a communication unit configured for uploading an image and a video;
a first hardware switch button, disposed on the camera device and configured for sensing a first manipulation input; and
a control module, coupled with the camera unit and the first hardware switch button, in response to the first manipulation input sensed by the first hardware switch button, the control module being adapted to:
trigger the camera unit for selectively capturing between the image and the video according to a holding duration of the first manipulation input sensed by the first hardware switch button; and
trigger the communication unit for uploading the image or the video according to the first manipulation input immediately after the image or the video is captured,
wherein in response to each time the first hardware switch button is pressed and then released within a first predetermined duration, the camera unit is triggered to capture the image, and
wherein the camera unit is triggered to record a streaming video and the streaming video is lively broadcasted onto a cloud server through the communication unit in response to the first hardware switch button is pressed and held over the first predetermined duration, the camera unit is triggered to record the video in response to the first hardware switch button is pressed and held further over a second predetermined duration, the second predetermined duration is longer than the first predetermined duration.

2. The camera device without display of claim 1, wherein the camera device has a plurality of functional modes comprising a photo-capturing mode, a video-recording mode and a stream-broadcasting mode, the control module is configured to trigger the camera device into one of the functional modes corresponding to the holding duration of the first manipulation input sensed by the first hardware switch button.

3. The camera device without display of claim 1, further comprising:
a second switch button, disposed on the camera device for sensing a second manipulation input,
wherein the control module is further adapted to enable or disable uploading function according to the second manipulation input.

4. The camera device without display of claim 1, further comprising:
a grip sensor, disposed on the camera device and configured for sensing a pressure value on a surface of the camera device,
wherein the control module is further coupled with the grip sensor and configured for determining whether the camera device is gripped, the first hardware switch button is deactivated in response to the camera device is not gripped.

5. The camera device without display of claim 1, wherein the cloud server comprises a cloud storage server, a social website server or a video broadcasting website server.

6. A manipulation method, suitable for a camera device without display, the camera device comprising a camera unit, a communication unit and a first hardware switch button, the manipulation method comprising:
sensing a first manipulation input by the first hardware switch button;
in response to the first manipulation input, triggering the camera unit for selectively capturing between an image and a video according to a holding duration of the first manipulation input sensed by the first hardware switch button; and
in response to the first manipulation input, triggering the communication unit for uploading the image or the video immediately after the image or the video is captured,
wherein in response to each time the first hardware switch button is pressed and then released within a first predetermined duration, the camera unit is triggered to capture the image, and
wherein the camera unit is triggered to record a streaming video and the streaming video is lively broadcasted onto a cloud server through the communication unit in response to the first hardware switch button is pressed and held over the first predetermined duration, the camera unit is triggered to record the video in response to the first hardware switch button is pressed and held further over a second predetermined duration, the second predetermined duration is longer than the first predetermined duration.

7. The manipulation method of claim 6, wherein the camera unit has a plurality of functional modes comprising a photo-capturing mode, a video-recording mode and a stream-broadcasting mode, the manipulation method further comprising:
triggering the camera unit into one of the functional modes corresponding to the holding duration of the first manipulation input sensed by the first hardware switch button.

8. The manipulation method of claim 6, further comprising:
sensing a second manipulation input by a second switch button; and
selectively disabling uploading function of the communication unit according to the second manipulation input.

9. The manipulation method of claim 6, further comprising:

sensing a pressure value by a grip sensor; and
selectively suspending the first hardware switch button according to the pressure value.

10. The manipulation method of claim 6, wherein the cloud server comprises a cloud storage server, a social website server or a video broadcasting website server.

11. A non-transitory computer readable storage medium with a computer program to execute a manipulation method, wherein the manipulation method comprises:
sensing a first manipulation input;
in response to the first manipulation input, triggering a camera unit for selectively capturing between an image and a video according to a holding duration of the first manipulation input sensed by a first hardware switch button; and
in response to the first manipulation input, triggering a communication unit for uploading the image or the video immediately after the image or the video is captured,
wherein in response to each time the first hardware switch button is pressed and then released within a first predetermined duration, the camera unit is triggered to capture the image, and
wherein the camera unit is triggered to record a streaming video and the streaming video is lively broadcasted onto a cloud server through the communication unit in response to the first hardware switch button is pressed and held over the first predetermined duration, the camera unit is triggered to record the video in response to the first hardware switch button is pressed and held further over a second predetermined duration, the second predetermined duration is longer than the first predetermined duration.

12. The non-transitory computer readable storage medium of claim 11, wherein the manipulation method further comprising:
sensing a second manipulation input; and
selectively disabling uploading function of the communication unit according to the second manipulation input.

13. The non-transitory computer readable storage medium of claim 11, wherein the camera unit has a plurality of functional modes comprising a photo-capturing mode, a video-recording mode and a stream-broadcasting mode, the manipulation method further comprising:
triggering the camera unit into one of the functional modes corresponding to the holding duration of the first manipulation input.

14. The non-transitory computer readable storage medium of claim 11, wherein the cloud server comprises a cloud storage server, a social website server or a video broadcasting website server.

15. A camera device without display, comprising:
a camera unit;
a communication unit configured for uploading an image and a video;
a first hardware switch button, disposed on the camera device and configured for sensing a first manipulation input; and
a control module, coupled with the camera unit and the first hardware switch button, in response to the first manipulation input sensed by the first hardware switch button, the control module being adapted to:
trigger the camera unit for selectively capturing between the image and the video according to a holding duration of the first manipulation input sensed by the first hardware switch button; and
trigger the communication unit for uploading the image or the video to a cloud server according to the first manipulation input immediately after the image or the video is captured,
wherein in response to each time the first hardware switch button is pressed and then released within a first predetermined duration, the camera unit is triggered to capture the image,
wherein the camera unit is triggered to record the video in response to the first hardware switch button is pressed and held over the first predetermined duration, the camera unit is triggered to record a streaming video and the streaming video is lively broadcasted onto the cloud server through the communication unit in response to the first hardware switch button is pressed and held further over a second predetermined duration, the second predetermined duration is longer than the first predetermined duration.

16. A manipulation method, suitable for a camera device without display, the camera device comprising a camera unit, a communication unit and a first hardware switch button, the manipulation method comprising:
sensing a first manipulation input by the first hardware switch button;
in response to the first manipulation input, triggering the camera unit for selectively capturing between an image and a video according to a holding duration of the first manipulation input sensed by the first hardware switch button; and
in response to the first manipulation input, triggering the communication unit for uploading the image or the video to a cloud server immediately after the image or the video is captured,
wherein in response to each time the first hardware switch button is pressed and then released within a first predetermined duration, the camera unit is triggered to capture the image,
wherein the camera unit is triggered to record the video in response to the first hardware switch button is pressed and held over the first predetermined duration, the camera unit is triggered to record a streaming video and the streaming video is lively broadcasted onto the cloud server through the communication unit in response to the first hardware switch button is pressed and held further over a second predetermined duration, the second predetermined duration is longer than the first predetermined duration.

17. A non-transitory computer readable storage medium with a computer program to execute a manipulation method, wherein the manipulation method comprises:
sensing a first manipulation input;
in response to the first manipulation input, triggering a camera unit for selectively capturing between an image and a video according to a holding duration of the first manipulation input sensed by a first hardware switch button; and
in response to the first manipulation input, triggering a communication unit for uploading the image or the video to a cloud server immediately after the image or the video is captured,
wherein in response to each time the first hardware switch button is pressed and then released within a first predetermined duration, the camera unit is triggered to capture the image,
wherein the camera unit is triggered to record the video in response to the first hardware switch button is pressed and held over the first predetermined duration, the camera unit is triggered to record a streaming video and the streaming video is lively broadcasted onto the cloud server through the communication unit in response to the first hardware switch button is pressed and held further over a second predetermined duration, the second predetermined duration is longer than the first predetermined duration.

* * * * *